United States Patent
Lee et al.

(10) Patent No.: US 6,801,492 B2
(45) Date of Patent: Oct. 5, 2004

(54) SOLID IMMERSION MIRROR TYPE OBJECTIVE LENS AND OPTICAL PICKUP DEVICE ADOPTING THE SAME

(75) Inventors: Chul-woo Lee, Gyeonggi-do (KR); Ki-won Lee, Seoul (KR); Seung-tae Jung, Gyeonggi-do (KR); Dae-sik Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 10/012,475

(22) Filed: Dec. 12, 2001

(65) Prior Publication Data

US 2002/0075785 A1 Jun. 20, 2002

(30) Foreign Application Priority Data

Dec. 14, 2000 (KR) ........................................ 2000-76492

(51) Int. Cl.[7] .............................................. G11B 7/135
(52) U.S. Cl. .............................. 369/112.26; 369/112.25; 359/731
(58) Field of Search ...................... 369/112.26, 112.25, 369/13.33, 112.2; 359/731, 730, 719, 729

(56) References Cited

U.S. PATENT DOCUMENTS

| | | | | |
|---|---|---|---|---|
| 5,042,928 A | * | 8/1991 | Richards | 359/728 |
| 5,793,538 A | * | 8/1998 | Cameron et al. | 359/731 |
| 6,266,315 B1 | * | 7/2001 | Lee et al. | 369/112.01 |
| 6,377,535 B1 | * | 4/2002 | Chen et al. | 369/112.09 |

* cited by examiner

Primary Examiner—W. R. Young
Assistant Examiner—M. V. Battaglia
(74) Attorney, Agent, or Firm—Staas & Halsey LLP

(57) ABSTRACT

A solid immersion mirror (SIM) type objective lens and an optical pickup employing the same. The objective lens has a first curved surface which condenses incident light and a second curved surface surrounding the first curved surface which diverges incident light. A second transmission surface disposed to face the first transmission surface has an area which transmits incident light and a first reflection surface surrounding the second transmission surface which reflects incident light. A second reflection surface which surrounds the second curved reflects incident light. The objective lens realizes an NA of 0.7 or more with a single lens; has a working distance enabling far field recording/reproducing; has a smaller blocking area than that of the conventional SIM; and generates a smaller amount of side lobe. Where the objective lens is adopted in an optical pickup device, generation of jitter during reproduction or cross erasure during recording is minimized.

29 Claims, 5 Drawing Sheets

SOLID IMMERSION MIRROR TYPE OBJECTIVE LENS AND OPTICAL PICKUP DEVICE ADOPTING THE SAME

CROSS REFERENCE TO RELATED APPLICATIONS

This application claims the benefit of Korean Application No. 2000-76492 filed Dec. 14, 2000, in the Korean Patent Office, the disclosure of which is incorporated herein by reference.

BACKGROUND OF THE INVENTION

1. Field of the Invention

The present invention relates to a solid immersion mirror (SIM) type objective lens and an optical pickup device adopting the same, and particularly, to a modified SIM type objective lens for far field recording/reproducing, and an optical pickup device adopting the same.

2. Description of the Related Art

In general, information recording/reproducing density increases as a size of a light spot formed on an optical disc by an optical pickup device is decreased. The size of a light spot decreases as a wavelength of a light beam in use becomes shorter and an NA of an objective lens which focuses the light spot becomes greater. A relationship of the size of a light spot to wavelength and NA is shown in equation (1).

$$\text{Size of light spot} \propto \lambda/\text{NA} \quad (1)$$

Thus, an optical pickup device for high density should adopt a light source emitting a light beam having a shorter wavelength and an objective lens having a high NA. To realize a stable system, the objective lens should have a working distance (a distance from a light exit surface of an objective lens to a light input surface of an optical disc) which is large. An optical pickup device for recoding/reproducing information on/from an optical disc of a next generation DVD family, or a so-called HD-DVD (high definition digital versatile disk) family, may adopt, for example, a light source for emitting a light beam having a wavelength of 405 nm and an objective lens having an NA of 0.85 and a large working distance.

However, due to a limit in manufacture, it is difficult to manufacture an objective lens formed of a single lens having an NA of 0.7 or more and satisfying an allowance condition of optical aberration. Thus, to realize an NA of 0.7 or more and satisfy an allowance condition of optical aberration, an objective lens 10 formed of two lenses as shown in FIG. 1 has been suggested.

Referring to FIG. 1, a conventional objective lens 10 includes a first condensing lens 11 for condensing incident light and a second condensing lens 13 arranged between the first condensing lens 11 and an optical disc 1 for increasing an NA of the objective lens 10. In the objective lens 10, for example, where a 0.6 NA is secured by the first condensing lens 11, the NA may be increased by the second condensing lens 13. For the objective lens 10 to have a 0.85 NA, a light input surface of each of the first and/or second condensing lenses 11 and 13, facing a light source (not shown), is formed to have a large curvature, or at least one of the first and second condensing lenses 11 and 13 is formed of a material exhibiting a high refractive index, to produce a sharp refraction of light.

Thus, the objective lens 10 as shown in FIG. 1 is sensitive to decenter, being off an optical axis, and coma is greatly generated according to an amount of the decenter. Also, the objective lens 10 is difficult to manufacture because processing a lens surface having a large curvature is difficult.

Also, the working distance WD1 of the objective lens 10 is short, for example, about 0.15 mm due to a sharp refraction of light. It is difficult to design the objective lens 10 to have a working distance of 0.15 mm or more. For reference, the working distance of an objective lens in an optical pickup device for DVD is about 1.8 mm.

Since the objective lens 10 realizes a high NA by the structure of two lenses, where the first and second condensing lenses 11 and 13 are inclined to each other, it is impossible to maintain a small optical aberration. Thus, allowance of distance and inclination between the first and second condensing lenses 11 and 13 is very strictly obeyed.

Referring to FIG. 2, a conventional solid immersion mirror 20 includes a first transmission surface 21 for diverging and transmitting incident light, a second transmission surface 23 disposed to face the first transmission surface 21, a first reflection surface 25 formed around the second transmission surface 23, for reflecting incident light passing through the first transmission surface 21 and a second reflection surface 27, formed around the first transmission surface 21, for reflecting incident light reflected by the first reflection surface 25 to proceed toward the second transmission surface 23.

The solid immersion mirror 20 as described above may realize an NA of 0.7 or more with a single lens structure. In the solid immersion mirror 20, since a blocking area, indicated by a hatched area 29 in FIG. 2, exists where the light input to the first transmission surface 21 is relatively near the optical axis, some of the input light is not focused on a recording surface of the optical disc 1 and is lost. Here, the light lost by not being focused on the recording surface of the optical disc 1 is light directly input to the second transmission surface 23 from the first transmission surface 21, and light which is lost at a boundary between the first transmission surface 21 and the second reflection surface 27 among the light from the fist transmission surface 21, reflected by the first reflection surface 25, and proceeding toward the second reflection surface 27. In FIG. 2, to show the blocking area, only a proceeding path of the light input to the first transmission surface 21 is shown. Light reflected by the recording surface of the optical disc 1 and input to the second transmission surface 23 proceeds in the reverse order along the light proceeding path shown in FIG. 2.

The solid immersion mirror 20 can realize a high NA of 0.7 or more with a single lens. Since the solid immersion mirror 20 has a structure in which light is condensed after reflected from the two reflection surfaces 25 and 27, curvature may be small so that the solid immersion mirror 20 may be insensitive to the decenter, exhibit relatively superior chromatism quality, and be manufactured easily.

However, since the blocking area exists due to the structure of the solid immersion mirror 20, as shown in FIG. 2, all of the incident light is not used, and the efficiency of light is reduced. About ⅓ of the incident light is blocked in the conventional solid immersion mirror 20.

Also, since the quantity of the blocked light depends on the size of the first transmission surface 21, the diameter of the first transmission surface 21 is made less than ¼ of an overall effective diameter of the solid immersion mirror 20 to minimize reducing the light efficiency. To maximize efficiency in an optical pickup device employing the solid immersion mirror 20 as an objective lens, an incident light beam having a diameter slightly greater than that of the first transmission surface 21 is input to the first transmission surface 21. Accordingly, the quantity of light input to the first transmission surface 21 is greatly affected by movement of the solid immersion mirror 20 for tracking in a radial direction perpendicular to the optical axis.

FIG. 3 shows a light beam intensity profile of light focused by the solid immersion mirror 20. As can be seen from FIG. 3, since a side lobe S1 which amounts to 5–6% of a peak value of the light intensity is relatively great, where the solid immersion mirror 20 is adopted as an objective lens of an optical pickup device, a great amount of jitter is generated during reproduction of information recorded on the optical disc 1 and a cross erasure problem of removing signals recorded on adjacent tracks may occur during recording. The conventional solid immersion mirror 20 used to generate the light intensity profile shown in FIG. 3 has an NA of 0.85, an overall effective diameter of 4.5 mm, and the first transmission surface 21 has a diameter of 1.0 mm. Thus, where about 33% of the quantity of light input to the first transmission surface 21 is blocked. FIG. 3 shows a light intensity profile of a beam having a 400 mm wavelength and focused by the conventional solid immersion mirror 20. A side lobe is also produced in light focused by the objective lens 10 as shown in FIG. 1. However, the side lobe produced in light focused by the objective lens 10 is about 2–3% or less of a peak value of the light intensity so that it does not cause a serious increase of jitter in a reproduction signal and cross erasure.

Further, since the conventional solid immersion mirror 20 having the structure shown in FIG. 2 has a short working distance WD2, the SIM 20 is usable as an objective lens for high density light condensation in a near field recording/reproducing needing a working distance of several tens to hundreds nano meters, but is not useable as an objective lens for far field recording/reproducing.

SUMMARY OF THE INVENTION

To solve the above-described and other problems, it is a first object of the present invention to provide a solid immersion mirror type objective lens formed of a single lens and having a high NA of 0.7 or more.

It is a second object of the invention to provide an optical pickup device which adopts the solid immersion mirror type lens formed of a single lens and having a high NA of 0.7 or more. The solid immersion mirror type objective lens of the present invention has a superior efficiency of light and a drastically reduced side lobe component compared with a conventional solid immersion mirror. Thus, where the solid immersion mirror type objective lens of the present invention is adopted in an optical pickup device, excess jitter is not generated during reproducing and cross erasure does not occur during recording. Also, since a relatively great working distance (compared with a conventional solid immersion mirror) is realizable, the solid immersion mirror type objective lens of the present invention is applicable to far field recording/reproducing.

Additional objects and advantages of the invention will be set forth in part in the description which follows, and, in part, will be obvious from the description, or may be learned by practice of the invention.

To achieve the first and other objects of the invention, there is provided an objective lens comprising a first transmission surface formed of a first curved surface which condenses incident light and a second curved surface formed around the first curved surface which diverges incident light, a second transmission surface disposed to face the first transmission surface and which transmits incident light, a first reflection surface formed around the second transmission surface which reflects incident light, and a second reflection surface formed around the first transmission surface which reflects incident light.

To achieve the second and other objects of the invention, there is provided an optical pickup device comprising a light source which generates and emits a laser beam, an optical path changer which changes a proceeding path of incident light, an objective lens arranged on an optical path between the optical path changer and a recording medium which condenses incident light emitted from the light source to form a light spot on the recording medium, and a photodetector which detects incident light reflected by the recording medium and passing through the objective lens and the optical path changer, wherein the objective lens comprises a first transmission surface comprising a first curved surface and which condenses incident light and a second curved surface formed around the first curved surface which diverges incident light, a second transmission surface disposed to face the first transmission surface which transmits incident light, a first reflection surface formed around the second transmission surface which reflects incident light, and a second reflection surface formed around the first transmission surface which reflects incident light.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
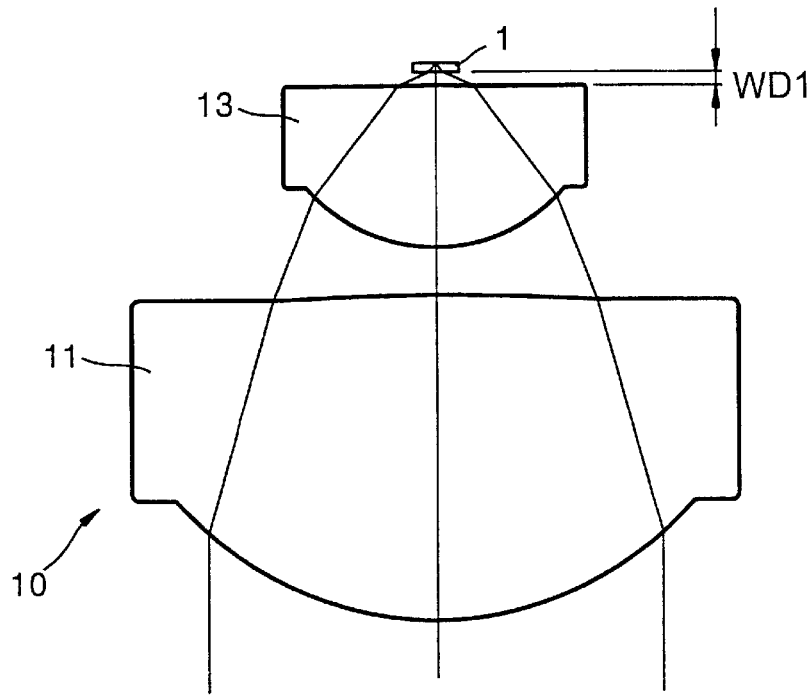
FIG. 1 is a view showing an example of a conventional objective lens formed of two lenses.

Reference will now be made in detail to the present embodiments of the present invention, examples of which are illustrated in the accompanying drawings, wherein like reference numerals refer to like elements throughout.

Figure 4:
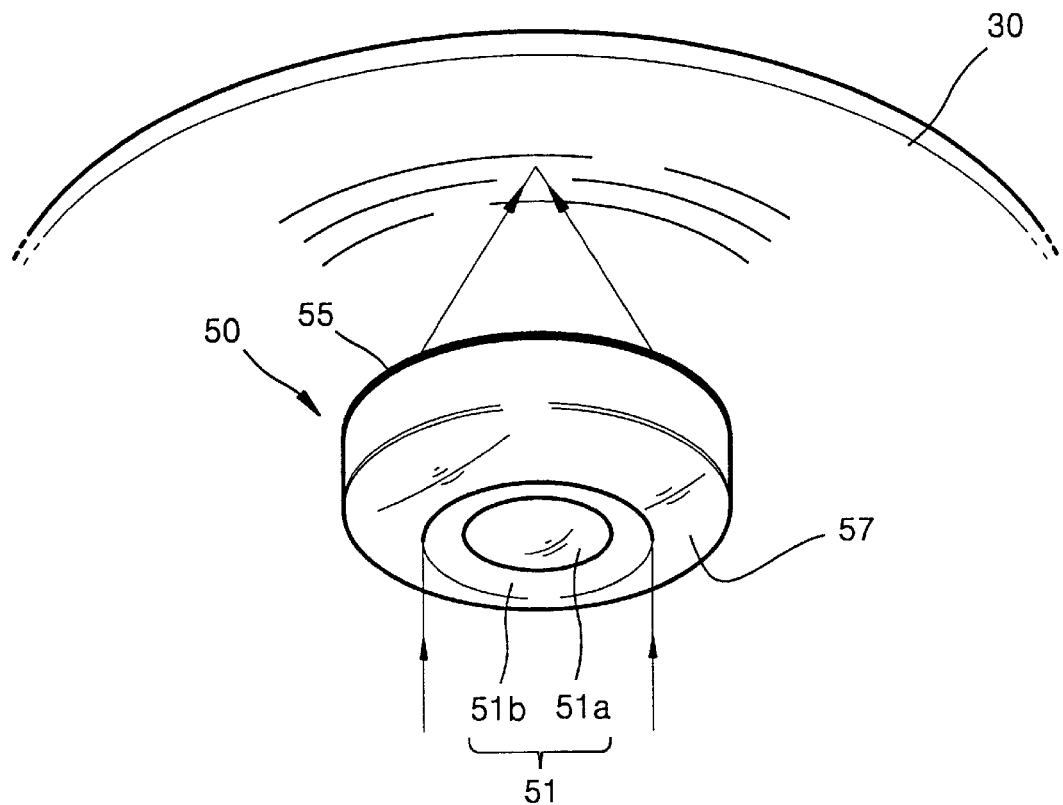
FIG. 4 is a perspective view of a solid immersion mirror type objective lens according to an embodiment of the present invention.
Figure 5:
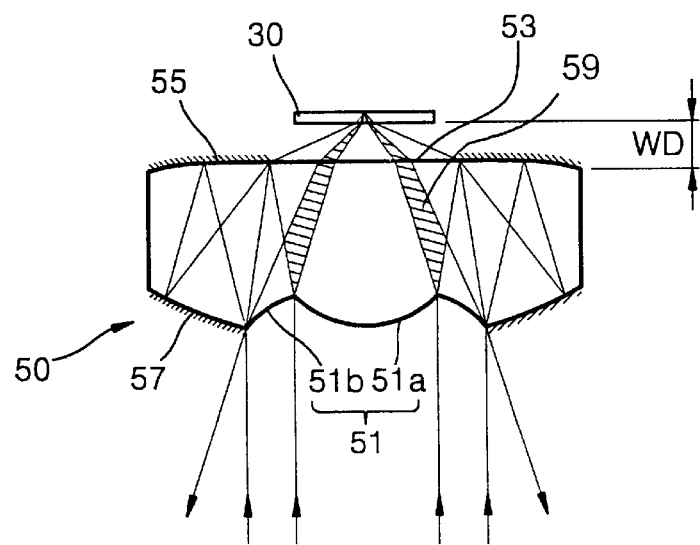
FIG. 5 is a side view of the solid immersion mirror type objective lens according to an embodiment of the present invention.

Referring to FIGS. 4 and 5, an objective lens 50 according to the present invention is a modified solid immersion mirror (SIM). The objective lens 50 comprises a first transmission surface 51 formed of a first curved surface, preferably, a convex surface 51a, disposed on an optical axis, and a second curved surface, preferably, a concave surface 51b, formed around the first curved surface, a second transmission surface 53 disposed to face the first transmission surface 51, a first reflection surface 55 formed around the second transmission surface 53, and a second reflection surface 57 formed around the first transmission surface 51.

The convex curved surface 51a of the first transmission surface 51 condenses light from a light source which is input relatively near the optical axis. The concave surface 51b is formed around the convex curved surface 51a and diverges light input radially outward from the convex curved surface 51a.

Preferably, the first transmission surface 51 has a diameter within a range including 2/5 and 4/5 of an overall effective diameter of the objective lens 50. Considering conditions such as minimization of a blocking area, realization of high NA and a great working distance, minimizing generation of coma due to decenter, and ease in manufacture, the convex surface 51a of the first transmission surface 51 preferably has a diameter within a range including 1/5 and 2/5 of the overall effective diameter of the objective lens 50. The diameter is maximum on a plane perpendicular to the optical axis of the first transmission surface 51 or the convex surface 51a.

Where light is input to the first transmission surface 51 of the objective lens 50 according to the present invention, the light incident upon the convex surface 51a of the first transmission surface 51 is condensed by the convex surface 51a, directly proceeds toward the second transmission surface 53 and passes the second transmission surface 53, and is focused on a recording surface of the recording medium 30, for example, a disc of a next generation DVD family. The light incident upon the concave surface 51b of the first transmission surface 51 is diverged and most light proceeds toward the first reflection surface 55. Then, the light which is incident on the first transmission surface 55 is sequentially reflected by the first and second reflection surfaces 55 and 57 and passes through the second transmission surface 53. Like the light passing through the convex surface 51a, the light passing through the concave surface 51b is focused on the recording surface of the recording medium 30.

Part of the light passing a boundary of the convex surface 51a and the concave surface 51b of the first transmission surface 51, reflected by the first reflection surface 55, and proceeding toward the second reflection surface 57, for example, light incident upon a boundary between the first transmission surface 51 and the second reflection surface 57, is lost and is not focused on the recording surface of the recording medium 30. The area of light which is not focused on the recording surface of the recording medium 30 is a blocking area which is indicated by hatching 59 in FIG. 5.

The modified SIM type objective lens 50 according to the present invention has all merits of the conventional SIM 20 and simultaneously exhibits superior decenter and chromatism features and a higher efficiency of light, compared with the conventional SIM 20. As shown in FIG. 5, the SIM type objective lens 50 according to the present invention has a great working distance (WD) and as shown in FIG. 6, the SIM type objective lens 50 generates a smaller quantity of side lobe S which does not cause serious jitter of a reproduction signal or cause cross erasure of the recording medium.

Since the modified SIM type objective lens 50 having the structure according to the present invention focuses the light incident on the convex surface 51a of the first transmission surface 51, the blocking area is drastically reduced, compared with the conventional SIM 20. Thus, an efficiency of light is high and the side lobe S is reduced, compared with the conventional SIM 20 described with reference to FIG. 2.

Figure 3:
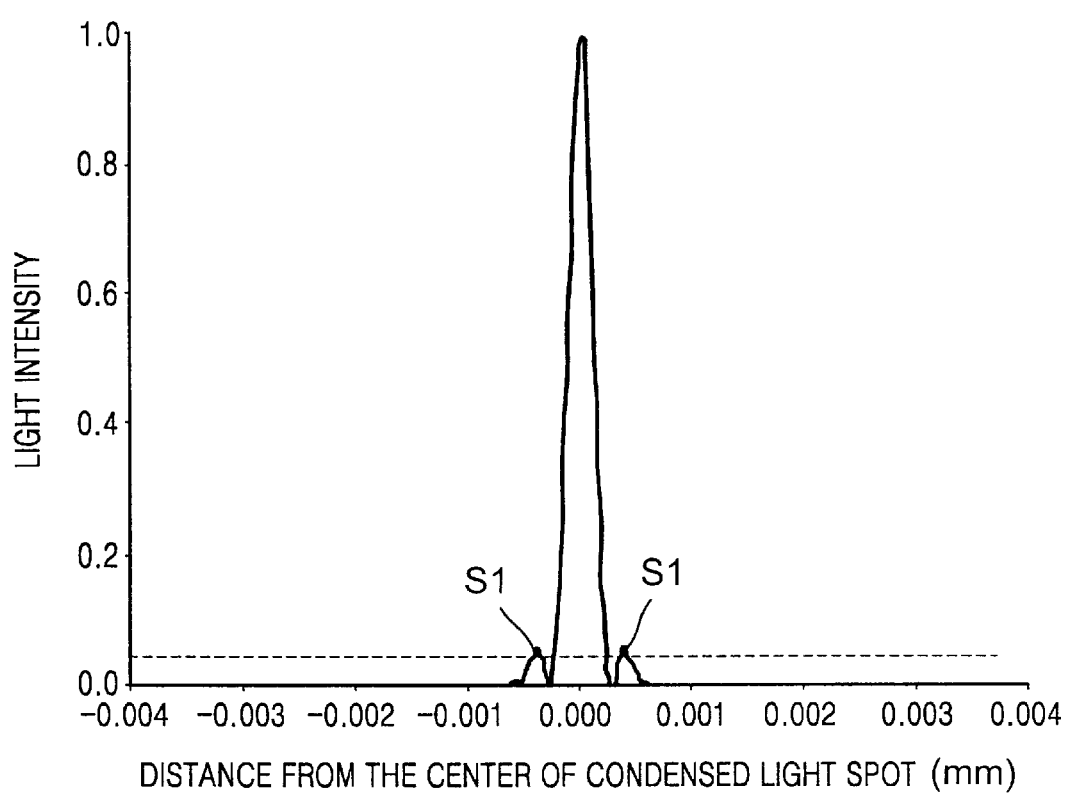
FIG. 3 is a graph showing a beam profile of light condensed by the solid immersion mirror of FIG. 2.
Figure 6:
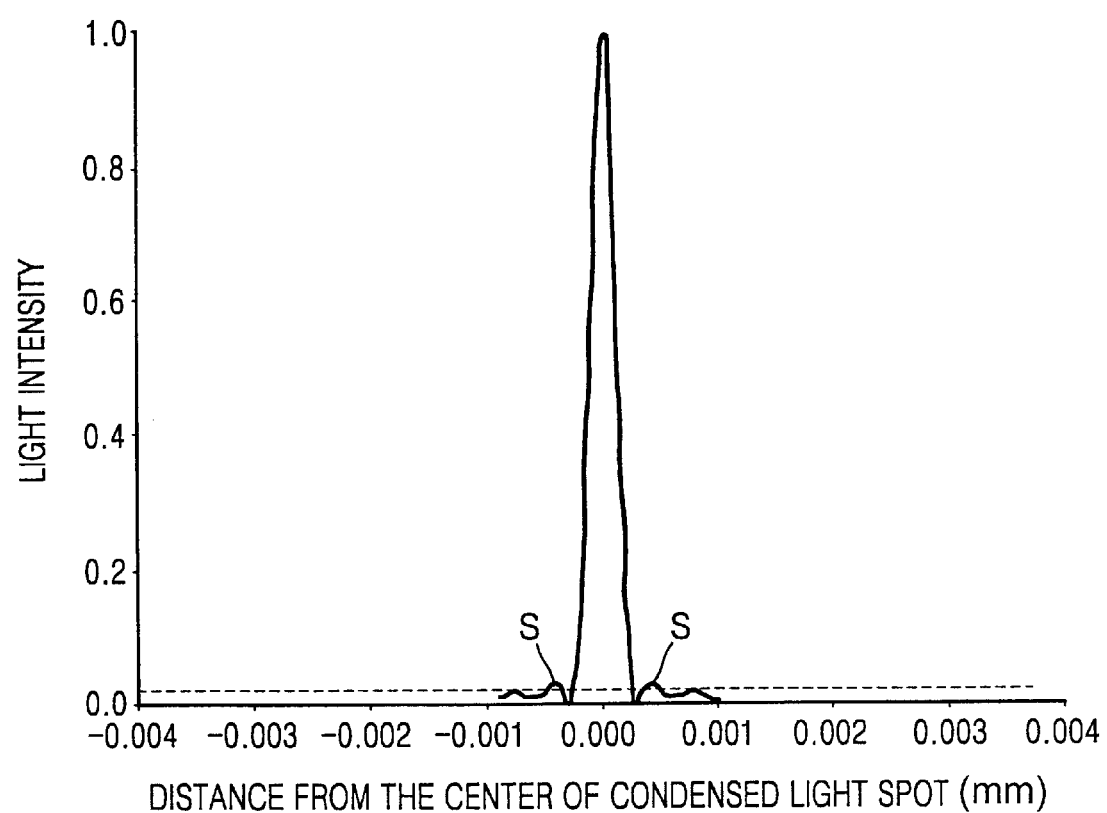
FIG. 6 is a graph showing a beam profile of light condensed by an objective lens according to the present invention.

FIG. 6 shows a beam profile of light condensed by the objective lens 50 according to the present invention. Performance of the objective lens of the present invention and performance of the conventional SIM are compared by comparing the light intensity profile of FIG. 6 with the light intensity profile of FIG. 3. Here, the light intensity profile of the objective lens 50 as shown in FIG. 6 is formed under the same conditions as the light intensity profile of the conventional SIM 20 as shown in FIG. 3. The data shown in FIG. 6 corresponds to an objective lens 50 having a convex surface 51a of which a radius of curvature and a diameter are 1.67 mm and 0.34 mm, respectively. Comparing FIG. 3 with FIG. 6, shows that the side lobe S of the SIM 50 of the present invention is reduced to 2% or less of a peak value of light intensity, compared with a peak of 5% to 6% in a case of the conventional SIM 20.

Experiments with the SIM type objective lens 50 of the present invention have confirmed that a 0.6 mm working distance (WD) is obtainable where the modified SIM type objective lens 50 is made such that an overall effective diameter of the objective lens 50 is about 5.0 mm, a diameter of the first transmission surface 51 is about 3.0 mm, a diameter of the convex surface 51a of the first transmission surface 51 is about 1.5 mm, and a maximum thickness of the objective lens 50 is about 1.7 mm. According to the experiments, the modified SIM type objective lens 50 as shown in FIGS. 4 and 5 obtains a working distance within a range including 0.1 mm and 0.6 mm, and indicates that a longer working distance is obtainable by a more strict design.

Figure 2:
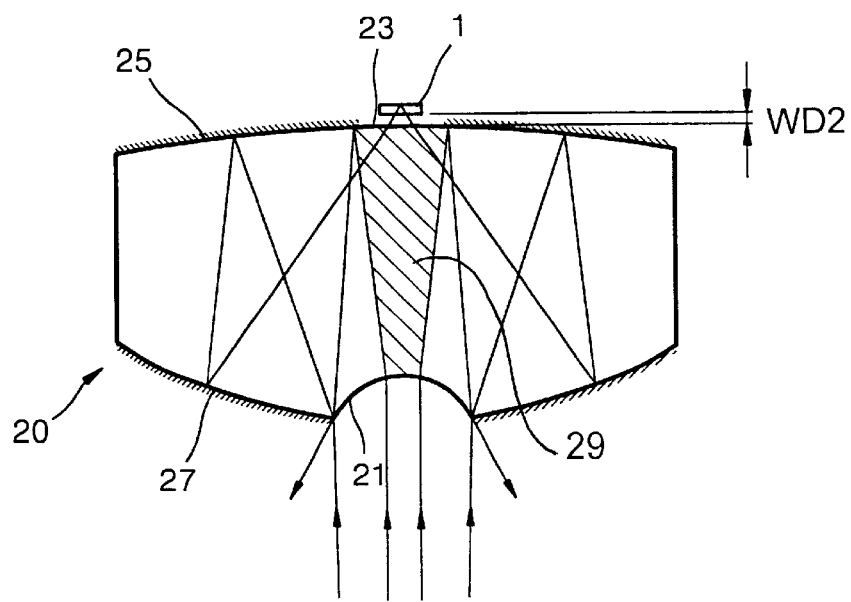
FIG. 2 is a view showing an example of a conventional solid immersion mirror.

Here, the working distance is not necessarily limited to the values obtained experimentally and the working distance is changeable depending on design conditions such as size and curvature of the first and second transmission surfaces 51 and 53, and the first and second reflection surfaces 55 and 57. Nevertheless, by forming the center portion of the first transmission surface 51 to be the convex surface 51a, a design having an NA of 0.7 or more, preferably, 0.85, and simultaneously having a working distance greater than that of the conventional objective lenses 10 and 20 described with reference to FIGS. 1 through 3 is obtainable.

Thus, since the objective lens 50 according to the present invention realizes a great working distance, the objective lens 50 is easily adopted as an objective lens of an optical pickup device for recording/reproducing a recording medium of a next generation DVD family for far field recording/reproducing.

Also, since a ratio of the diameter of the first transmission surface 51 and the overall effective diameter of the objective lens 50 is greater than a ratio of the diameter of the first transmission surface 21 and the overall effective diameter of the conventional SIM 20, an input light beam having a greater diameter than the conventional technology may be used. Thus, the quantity of light input to the first transmission surface 51 is relatively less affected by movement for tracking in a radial direction perpendicular to the optical axis than a similar movement in the technology incorporating the conventional SIM 20.

Figure 7:
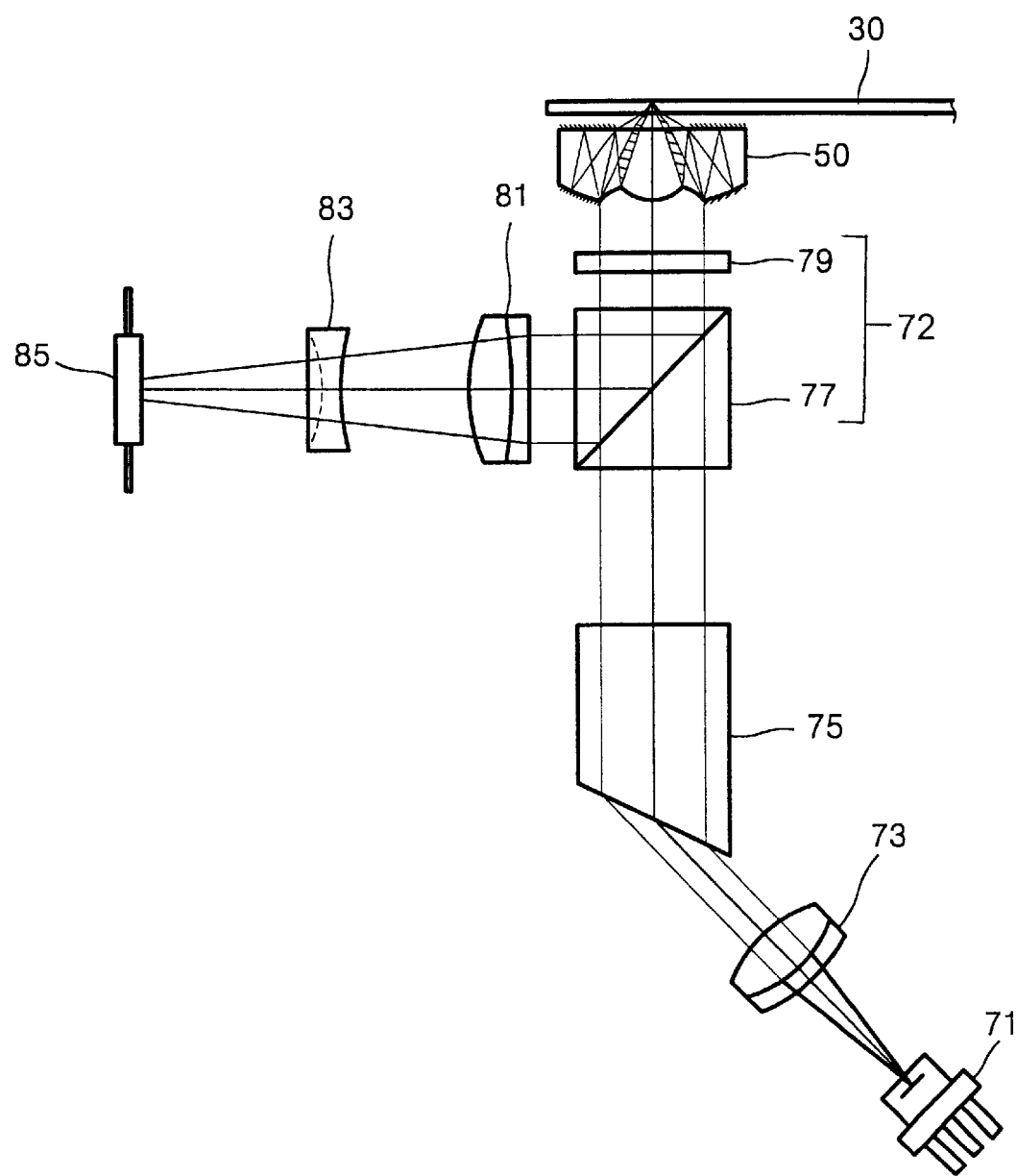
FIG. 7 is a view showing the optical arrangement of an optical pickup device adopting the objective lens according to the present invention.

FIG. 7 shows the optical arrangement of an optical pickup device for recording/reproducing a recording medium of a next generation DVD family adopting the modified SIM type objective lens 50 according to the present invention.

Referring to FIG. 7, an optical pickup device according to the present invention comprises a light source 71, a optical path changer 72 which changes a proceeding path of incident light, an objective lens 50 according to the present invention which condenses light emitted from the light source 71 to form a light spot on a recording medium 30, and a photodetector 85 which receives light reflected by the recording medium 30 and passing through the optical path changer 72.

The light source 71 comprises blue semiconductor laser which emits light having a wavelength of about 400–420 nm, preferably, about 405 nm. The semiconductor laser may be, for example, an edge emitting laser or a vertical cavity surface emitting laser.

The optical path changer 72 is arranged on the optical path between the light source 71 and the objective lens 50 to change a proceeding path of incident light. Preferably, the optical path changer 72, as shown in FIG. 7, comprises a polarized beam splitter 77 which selectively transmits or reflects incident light according to a polarization thereof, and a quarter wave plate 79 which changes a phase of the incident light. Alternatively, a beam splitter (not shown) which transmits and reflects incident light at a predetermined ratio may be provided as the optical path changer.

The objective lens 50 has an NA of 0.7 or more, preferably, 0.85, so that a light spot which enables recording/reproducing of a high density recording medium 30 such as a next generation DVD, or a so-called an HD-DVD, is formed. The photodetector 85 receives the light reflected by the recording medium 30 and detects an information signal and an error signal.

Preferably, a collimating lens 73 is provided on the optical path between the light source 71 and the optical path changer 72. The collimating lens 73 condenses the divergent light emitted from the light source 71 into a parallel light beam. As shown in FIG. 7, where the collimating lens 73 is arranged on the optical path between the light source 71 and the optical path changer, a condensing lens 81 is provided between the optical path changer 72 and the photodetector 85.

Where the edge emitting laser is adopted as the light source 71, a beam shaping prism 75 is preferably provided on the optical path between the collimating lens 73 and the optical path changer 72, so that information is recorded with a relatively low light power. The beam shaping prism 75 shapes an oval beam emitted from the edge emitting laser into a circular beam. Alternatively, the beam shaping prism 75 may be arranged between the light source 71 and the collimating lens 73. Where a vertical cavity surface emitting laser which emits an approximately circular beam is adopted as the light source 71, the beam shaping prism 75 is omitted from the optical arrangement shown in FIG. 7.

A sensing lens 83 is interposed between the condensing lens 81 and the photodetector 85. For example, where a focus error signal is detected by an astigmatism method, an astigmatism lens which causes astigmatism to the incident light may be provided as the sensing lens 83.

Since the optical pickup device according to the present invention adopts the modified SIM type objective lens 50 formed of a single lens, the optical pickup device is adapted to record or reproduce information on or from the recording medium 30 of a next generation DVD family. Also, an increase of jitter during reproduction of a signal and cross erasure do not occur. Cross erasure refers to erasing a signal recorded in an adjacent track.

Also, since the objective lens 50 having two reflection surfaces 55 and 57 is insensitive to chromatism, chromatism produced with respect to a change in wavelength according to a change in the amount of light output during a switch between reproduction and recording modes and/or an increase in width of a line width of a wavelength because the light source 71 is driven by HF (high frequency), is within a scope of allowance. Thus, by using the optical pickup device according to the present invention, quality recording and/or reproduction signals are obtained. Light having a wavelength of 405 nm is emitted from the light source 71 during output of reproduction power and light having a longer wavelength, for example, a wavelength of 406 nm, is emitted from the light source 71 during output of recording power.

FIG. 7 shows an embodiment of the optical pickup device adopting the objective lens 50 of the present invention. However, the optical pickup device according to the present invention is not limited to the optical arrangement of FIG. 7. Since the objective lens 50 according to the present invention secures an NA of 0.7 or more and a relatively great working distance by a structure using a single lens, the objective lens 50 may be adopted in various optical systems, in addition to the optical pickup device for recording/reproducing information on/from a recording medium of a next generation DVD family. For example, the objective lens 50 according to the present invention may be adopted to various optical systems needing a high NA and a relatively great working distance such as a microscopic apparatus, a microscopic apparatus with a CCD camera connected thereto, a semiconductor exposure apparatus having an objective lens, a light source, and a collimating lens to focus light on a semiconductor material. The objective lens 50 is also usable in an apparatus for exposing an optical mask pattern on a photosensitive medium and a mastering apparatus for manufacturing an optical disc by using an objective lens.

In FIGS. 4, 5, and 7, only a proceeding path of the light input to the first transmission surface 51 of the objective lens 50 is shown. The light reflected by the recording medium 30 and input to the second transmission surface 53 proceeds in the reverse order along the path shown in the drawings.

As described above, according to the present invention, by forming a surface on the optical axis on the first transmission surface and a concave surface around the convex surface in the SIM structure, an objective lens which has superior performance and which realizes a high NA of 0.7 or more with a single lens is obtainable.

That is, in the objective lens according to the present invention, since the blocking area is smaller than that of the conventional SIM, an efficiency of light is high. Also, in the objective lens according to the present invention, since a very small amount of side lobe is generated compared to the conventional SIM, where the objective lens of the present invention is adopted in an optical pickup device, excess generation of jitter during reproduction or cross erasure during recording does not occur. Further, the objective lens according to the present invention has a working distance which enables far field recording/reproducing. Therefore, the objective lens according to the present invention is especially suitable for use in an optical pickup device for recording/reproducing information on/from a recording medium of a next generation DVD family.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An objective lens comprising:
   a first transmission surface which transmits incident light, the first transmission surface comrprising:
   a first curved surface disposed on an optical axis which condenses a first portion of the incident light, and
   a second curved surface formed around the first curved surface which diverges a second portion of the incident light;

a second transmission surface disposed to face the first transmission surface and which transmits the incident light;

a first reflection surface formed around the second transmission surface which reflects the second portion of the incident light; and a second reflection surface formed around the first transmission surface which condenses the reflected second portion of the incident light.

2. The objective lens as claimed in claim 1, wherein the first curved surface of the first transmission surface is convex and the second curved surface is concave.

3. The objective lens as claimed in claim 2, wherein a ratio of a diameter of the first curved surface and an overall effective diameter of the objective lens is in a range including 1/5 and 2/5.

4. The objective lens as claimed in claim 1, wherein a ratio of a diameter of the first transmission surface and an overall effective diameter of the objective lens is in a range including 2/5 and 4/5.

5. The objective lens as claimed in claim 4, wherein a ratio of a diameter of the first curved surface and an overall effective diameter of the objective lens is in a range including 1/5 and 2/5.

6. The objective lens as claimed in claim 1, wherein a ratio of a diameter of the first curved surface and an overall effective diameter of the objective lens is in a range including 1/5 and 2/5.

7. An optical pickup device comprising:

a light source which emits light;

an optical path changer which changes a proceeding path of incident light;

an objective lens arranged on an optical path between the optical path changer and a recording medium which condenses the emitted light to form a light spot on the recording medium; and a photodetector which detects light reflected by the recording medium and passing through the objective lens and the optical path changer, wherein the objective lens comprises:
a first transmission surface which transmits incident light, the first transmission surface comprising:
a first curved surface disposed on an optical axis which condenses a first portion of the incident light, and
a second curved surface formed around the first curved surface which diverges a second portion of the incident light;
a second transmission surface disposed to face the first transmission surface which transmits the incident light;
a first reflection surface formed around the second transmission surface which reflects the second portion of the incident light; and
a second reflection surface formed around the first transmission surface which condenses the reflected second portion of the incident light.

8. The optical pickup device as claimed in claim 7, wherein the first curved surface of the first transmission surface is convex and the second curved surface is concave.

9. The optical pickup device as claimed in claim 8, wherein a ratio of a diameter of the first curved surface and an overall effective diameter of the objective lens is in a range including 1/5 and 2/5.

10. The optical pickup device as claimed in claim 8, wherein the objective lens has an NA of 0.7 or more.

11. The optical pickup device as claimed in claim 8, wherein a working distance between the second transmission surface and the recording medium is in a range including 0.1 mm and 0.6 mm.

12. The optical pickup device as claimed in claim 7, wherein a ratio of a diameter of the first transmission surface and an overall effective diameter of the objective lens is in a range including 2/5 and 4/5.

13. The optical pickup device as claimed in claim 12, wherein a ratio of a diameter of the first curved surface and an overall effective diameter of the objective lens is in a range including 1/5 and 2/5.

14. The optical pickup device as claimed in claim 12, wherein the objective lens has an NA of 0.7 or more.

15. The optical pickup device as claimed in claim 7, wherein a ratio of a diameter of the first curved surface and an overall effective diameter of the objective lens is in a range including 1/5 and 2/5.

16. The optical pickup device as claimed in claim 7, wherein the light source emits light having a wavelength in a range including 400 nm and 420 nm.

17. The optical pickup device as claimed in claim 16, wherein the objective lens has an NA of 0.7 or more.

18. The optical pickup device as claimed in claim 7, wherein the objective lens has an NA of 0.7 or more.

19. An apparatus comprising:

an objective lens which focuses light onto an object;

a light source which emits the light; and an optical system which transmits the light to the objective lens;

wherein the objective lens comprises:
a first curved surface which condenses a first portion of the emitted light to form a light spot on the object,
a second curved surface formed around the first curved surface and which diverges a second portion of the emitted light;
a transmission area disposed adjacent the recording medium;
a first reflection surface disposed radially outward from the transmission area which reflects the diverged light; and
a second reflection surface formed around the second curved surface which condenses the reflected light toward the light spot.

20. The apparatus of claim 19, wherein the object is an optical recording medium.

21. The apparatus of claim 19, wherein the aparatus is an optical disc mastering apparatus.

22. The apparatus of claim 19, wherein the apparatus exposes an optical mask pattern on a photosensitive medium.

23. The apparatus of claim 19, wherein the apparatus is a semiconductor exposure apparatus and the object is a semiconductor material.

24. The optical head of claim 19, wherein:

the objective lens has an NA of 0.7 or more, and a working distance between the transmission area and the object is in a range including 0.1 mm and 0.6 mm.

25. An optical head comprising:

an objective lens which gathers light from an object;

a photodetector which converts the gathered light into an electrical signal;

an optical system which transmits the gathered light to the photodetector;

wherein the objective lens comprises:

a transmission area disposed adjacent the object which transmits the gathered light;
a first curved surface which converges a first portion of the gathered light;
a first reflection surface formed around the transmission area;
a second curved surface formed around the first curved surface; and
a second reflection surface formed around the second curved surface;
wherein a second portion of the gathered light is sequentially reflected by the second and first reflection surfaces and diverged by the second curved surface.

26. The optical head of claim 25, wherein the photodetector is a CCD camera.

27. The optical head of claim 25, wherein:
the photodetector is a CCD camera, and
the optical system is a microscope apparatus.

28. The optical head of claim 25, wherein:
the objective lens has an NA of 0.7 or more, and
a working distance between the transmission area and the object is in a range including 0.1 mm and 0.6 mm.

29. The optical head of claim 25, wherein the object is an optical recording medium.

* * * * *